Patented May 23, 1933

1,910,806

UNITED STATES PATENT OFFICE

EDWARD MILANI, OF SAN FRANCISCO, CALIFORNIA

METHOD OF PACKING PERISHABLE PRODUCTS

No Drawing.   Application filed January 3, 1930. Serial No. 418,416.

The present invention relates to the method of preserving products of vegetation, particularly fresh flowers, fruits and vegetables, and the like, in a non-sterilized condition, and is related to the subject matter of my issued Patent No. 1,459,232, dated June 19, 1923, and my pending application, Serial Number 1,925, filed January 12, 1925.

The invention has for its principal object to enable fresh vegetables, fruits and flowers and the like to be packed and preserved within a container or compartment in fresh and naturally developed condition as they would be picked or harvested for market, and in such condition shipped to distant points or maintained in storage for subsequent use for a period of considerable length of time.

As is well known, all living vegetable matter having moisture therein is subject to decay under ordinary atmospheric conditions, but to dessicate or to completely sterilize such products alters their physical texture, their natural taste, and their fresh appearance. To preserve this natural moisture and to prevent decay and yet retain physical texture, natural taste and fresh appearance is the purpose of this invention.

The invention consists primarily in the picking or harvesting products of vegetation such as those indicated, at what may be termed its marketable stage of maturity, hereafter explained, placing same under the effect of a condition of refrigeration where the temperature is slightly above the temperature at which the specific product being then handled or packed is subject to deterioration by lowering of temperature, and sealing said products, while in said refrigerated condition, in a container or compartment which is vented. This method arrests deterioration from natural causes so that the product is preserved in its usable physical condition for a much greater length of time than if said method were not used, but it is understood that this is not a method for permanently preserving such products.

I have discovered in experimenting with the preservation of products of vegetation, such as fresh flowers, vegetables and fruits, that the decay of the product can be delayed for a limited length of time by packing same in a container, sealed other than having a relatively small vent therein. I have previously discovered, as covered by my said Letters Patent aforesaid, that producing or injecting from a source independent of the product an inert gas within a hermetically sealed container would preserve products of vegetation packed in said container for a certain length of time, the time of preservation dependent on the specific product packed therein, and the conditions under which it is thereafter handled, but in any event, for a longer period than if my method is not used.

The product itself generates within the container a preservative gas, due to natural causes of deterioration by decay, and if the injected or produced gas is hermetically sealed within the container or compartment the pressure thereof augmented by the additional gas created by gradual decay of the product will produce a gas pressure within the container which will impregnate the pores of the product as the pressure increases, and will hasten the deterioration upon opening the container in the degree of permeation that the gas supplants the natural moisture and fills the pores of and thereby devitalizes the product, and will destroy the natural flavor of the product if it be an edible product.

In my present method, I have eliminated the production or injection of a gas in the container from an independent source, and depend on the gas generated by the oxidation in the enclosed product itself.

In order to avoid gas pressure within the compartment from becoming great enough to impregnate the product, I have found it advantageous and desirable to place a vent in the container of sufficient size so that the gas pressure caused by accumulating naturally produced gases within the container would be slightly greater than atmospheric pressure, it being desirable to have said vent at one portion of the container only, for the reason that the gas within the container, as before stated, creates a pressure which will seek the line of least resistance to escape. If the vent is on both sides of the container or otherwise relatively positioned in any considerable spaced relationship, the gas passing out of one vent relieves the pressure elsewhere, so that atmospheric pressure outside the container causes air and atmospheric moisture to enter the other vent. While this air and foreign moisture entry may not be great in volume, it is sufficient to hasten disintegration and decay of the product in the container. While as a practical matter it is preferred to provide a single vent, I do not desire to limit my invention to a single vent exclusively, since two or more vents may be provided having reduced size relation to a single vent, but collectively having a total venting capacity of a single vent.

In describing my invention, I refer to the picking or harvesting of the product at the time it has matured to its marketable condition. This marketable condition will vary with the commodity, and may or may not be at the stage of maturity. For instance, cucumbers for small sweet pickles and bananas would be picked before reaching full maturity in either size or flavor, whereas fruits such as pears, would be picked at substantial maturity in size but before complete maturity in flavor; on the other hand, cabbage or cauliflower would be picked substantially at maturity in both size and flavor. The use of the term "marketable condition" contemplates that the product will be harvested at the stage of maturity when it would ordinarily be severed from its tree or vine for shipment, in the commercial market for use in its then existing natural condition, without artificial preservation methods. The degree of lowering of temperature prior to sealing the product in a container is also incapable of exact definition by thermometer reading, because different products will require varying degrees of reduction of temperature in order to effect refrigeration thereof, but generally from 33° to 40° F., would be the preferred temperature, since it would be undesirable to subject the product to a freezing temperature.

With the foregoing explanations, my method consists of harvesting the product of vegetation at its marketable stage of maturity and subjecting same to a temperature slightly above that temperature at which said product would be deteriorated by cold. For this purpose, I prefer such refrigeration to be accomplished by placing the commodity in a container having as large an opening therein as possible and refrigerating said product by any suitable refrigerating means to the extent mentioned above, so that the cold penetrates entirely through the product. If desired, in order to accomplish this complete refrigeration, the product may be placed in baskets of wire mesh so that the surface will be more exposed than in a container having an imperforated wall and refrigeration may be effected more quickly. When the product is refrigerated to the extent above described, it is sealed in a container or compartment which is air-tight and moisture tight, with the exception of a small vent at one portion of the container.

The size of this vent is relatively proportioned to the size of the container and the commodity therein, and is preferably positioned at one portion of the container only, for the reason above specified.

By maintaining the packed containers refrigerated in transit or in storage, the formation within the container of gas generated by the chemical reaction within the product itself may be delayed or retarded, since this gas is understood to be caused by progressive further maturing of the vegetation. At such time as the product begins to further mature after being sealed in the container, it throws off a gas which permeates the air spaces of the container not occupied by the product. As the generated gas gradually increases and flows out through the vent, it gradually carries with it the air in the container so that eventually the air space is occupied by gas only; but since the path of least resistance to the increasing gas is through the vent, as compared with the resistance of the physical body of the product, the product will not be impregnated with the gas nor the flavor thereof.

My experiments have shown that the generated gas will, for a limited time, preserve a condition which exists at the time the gas becomes generated.

It is well known that products of vegetation such as flowers, vegetables and fruits, are at their best when the flesh thereof is firm, crisp, succulent. Thorough refrigeration prior to sealing produces this condition, and the generation of the gas as the refrigeration loses its effect maintains this condition, whereas if the refrigeration takes place after sealing, an excess of moisture will form from condensation within the container, and this hastens decay.

While I have generally referred to refrigeration of the product because such products are usually packed at a temperature which is considerably above the freezing temperature of 32° F., it is to be understood that the term "refrigeration" also covers the unusual situation where such products might be packed in temperatures below freezing; in either event the product should be brought to a temperature slightly above the temperature at which the product is deteriorated by cold.

Such refrigeration prior to sealing drives out or eliminates from the product the natural heat by which nature matures such products, leaving the natural moisture in the product. If the product at such chilled state is permitted to remain subject to atmospheric conditions, the natural moisture will be absorbed from the product, and the product will become shrivelled.

The packing of the product in this chilled condition in the container having a small vent as above described, preserves this natural moisture by preventing the normal atmospheric evaporation, and it is the preservation of this natural moisture of the product combined with the chemical reaction of the naturally produced preservative gas on the physical body or pulp of the product, which delays the further maturity or decay thereof.

The purpose of my method is not to permanently preserve such products for an indeterminate period, and it is assumed that products so packed, whether in transit or storage would receive the usual care and treatment accorded to products of this nature, so as to avoid temperatures of excessive heat or excessive cold, though this does not contemplate a necessity for continual refrigeration to the temperature at which the product is packed in the container.

Having thus described my invention, I claim:—

1. A method of packing perishable products to delay decay thereof, which consists in subjecting said product while exposed to atmospheric air to a temperature at which it is chilled and subsequently subjecting said product to the effect of an inert gas within a sealed container, venting the gas in the container to outside air through a vent proportioned to automatically maintain a pressure of gas in said container sufficient to resist entry of atmospheric air and insufficient to permeate the product.

2. A method of packing perishable products to delay decay thereof, which consists in subjecting said product in its marketable condition to a temperature slightly above the temperature at which said product is deteriorated by cold, and thereafter placing same in a container through a filling opening, sealing the container against communication with the atmosphere except at one portion, and subjecting said product to the effect of inert gas within the container while said one portion remains in communication with the atmosphere.

In testimony whereof I have signed my name to this specification.

EDWARD MILANI.